(12) United States Patent
Eckel et al.

(10) Patent No.: US 10,061,078 B1
(45) Date of Patent: Aug. 28, 2018

(54) POLYMER MICROLATTICE STRUCTURES WITH MULTIFUNCTIONAL COATINGS FOR SUBSTRATE BONDING

(71) Applicant: HRL Laboratories, LLC, Malibu, CA (US)

(72) Inventors: Zak C. Eckel, Newbury Park, CA (US); Jacob M. Hundley, Newbury Park, CA (US); Alan J. Jacobsen, Woodland Hills, CA (US); Eric C. Clough, Santa Monica, CA (US); Thomas Boundy, Malibu, CA (US)

(73) Assignee: HRL Laboratories, LLC, Malibu, CA (US)

( * ) Notice: Subject to any disclaimer, the term of this patent is extended or adjusted under 35 U.S.C. 154(b) by 306 days.

(21) Appl. No.: 14/583,298

(22) Filed: Dec. 26, 2014

Related U.S. Application Data

(60) Provisional application No. 61/920,919, filed on Dec. 26, 2013.

(51) Int. Cl.
*B32B 3/10* (2006.01)
*G02B 6/12* (2006.01)
(Continued)

(52) U.S. Cl.
CPC ............ *G02B 6/12002* (2013.01); *B32B 3/10* (2013.01); *B32B 27/08* (2013.01); *B32B 27/365* (2013.01);
(Continued)

(58) Field of Classification Search
None
See application file for complete search history.

(56) References Cited

U.S. PATENT DOCUMENTS

| 7,382,959 B1 | 6/2008 | Jacobsen |
| 7,645,642 B2 | 1/2010 | Bauer et al. |

(Continued)

FOREIGN PATENT DOCUMENTS

| EP | 0084631 B1 | 3/1986 |
| EP | 1423256 B1 | 9/2007 |

OTHER PUBLICATIONS

Doty et al., "Hierarchical Polymer Microlattice Structures" Advanced Engineering Materials 2012, 14, No. 7, pp. 503-507.

*Primary Examiner* — Christopher Polley
(74) *Attorney, Agent, or Firm* — O'Connor & Company (57) ABSTRACT

In some variations, a polymer-based microlattice structure includes a plurality of intersecting micro-truss structural elements each comprising a thermoset first polymer, and a continuous coating layer (with a second polymer) that substantially encapsulates each of the micro-truss structural elements, wherein the second polymer in the continuous coating layer bonds the thermoset first polymer to a substrate. The micro-truss structural elements preferably are architecturally ordered and the coating layer is uniformly distributed within the microlattice structure. The polymer coating layer may be present over the entire microlattice surface area, thereby increasing bond area to improve toughness. The microlattice structure may also have higher glass-transition temperature and chemical resistance, compared to a microlattice structure without the coating layer. Methods of forming a polymer-based microlattice structure are also disclosed.

16 Claims, 3 Drawing Sheets

(51) Int. Cl.
*B32B 27/08* (2006.01)
*B32B 27/36* (2006.01)
*G02B 6/138* (2006.01)

(52) U.S. Cl.
CPC .......... *G02B 6/138* (2013.01); *B32B 2250/03* (2013.01); *B32B 2255/26* (2013.01); *B32B 2551/00* (2013.01)

(56) References Cited

U.S. PATENT DOCUMENTS

| | | | |
|---|---|---|---|
| 3,017,193 A1 | 9/2011 | Zhou et al. | |
| 8,353,240 B1* | 1/2013 | Schaedler | F41H 5/007 89/36.02 |
| 2013/0143060 A1* | 6/2013 | Jacobsen | B29C 71/02 428/594 |
| 2013/0196175 A1* | 8/2013 | Levit | B32B 38/00 428/688 |
| 2014/0272277 A1* | 9/2014 | Schaedler | C09D 1/00 428/116 |
| 2016/0039193 A1* | 2/2016 | Mankame | B29C 65/3612 156/212 |
| 2016/0089817 A1* | 3/2016 | Hundley | B29C 35/0266 264/496 |
| 2016/0090056 A1* | 3/2016 | Hundley | B60R 19/18 293/120 |

* cited by examiner

POLYMER MICROLATTICE STRUCTURES WITH MULTIFUNCTIONAL COATINGS FOR SUBSTRATE BONDING

PRIORITY DATA

This patent application is a non-provisional application with priority to U.S. Provisional Patent App. No. 61/920,919, filed Dec. 26, 2013, which is hereby incorporated by reference herein.

FIELD OF THE INVENTION

The present invention generally relates to microlattice structures and methods of bonding such microlattice structures to substrates using polymer coatings.

BACKGROUND OF THE INVENTION

An ordered three-dimensional (3D) microstructure is an ordered 3D structure at the micrometer or nanometer scale. 3D microstructures can be manufactured from polymer materials such as polymer cellular materials. Currently, polymer cellular materials that are mass produced are created through various foaming processes, which all yield random (not ordered) 3D microstructures. 3D microstructures may also be known as "micro-trusses."

A polymer optical waveguide can be formed in certain photopolymers that undergo a refractive index change during the polymerization process. When a monomer that is photo-sensitive is exposed to light (e.g., UV light) under the right conditions, the initial area of polymerization, such as a small circular area, will "trap" the light and guide it to the tip of the polymerized region due to the index of refraction change, further advancing that polymerized region. This process will continue, leading to the formation of a waveguide structure with approximately the same cross-sectional dimensions along its entire length.

For example, self-propagating polymer optical waveguide systems based on thiol-ene polymerization, are described in U.S. Pat. No. 8,017,193 issued Sep. 13, 2011 to Zhou and Jacobsen at HRL Laboratories, LLC in Malibu, Calif., United States. This patent describes formation of a polymeric micro-truss structure using monomer formulations appropriate for a thiol-ene system. This system produces high molecular weight by an alternating reaction between a thiyl radical reacting with a terminal unsaturated group followed by the reaction of a hydrogen radical with the carbon-centered radical to regenerate a thiyl radical and begin the process again.

In some commercial applications, it is necessary to join a thermoplastic polymer to a thermosetting polymer. Prior art exists for fusion welding of two thermoplastic polymer materials, but attachment of a thermoplastic material to a thermosetting polymer is not possible using conventional methods. Consequently, several different methods have recently been developed for forming a thermoset-thermoplastic polymer joint.

Thermoplastic encapsulation methods are known (see, for example, EP0084631B1). In this approach, a bond is formed between a cured thermoset and a thermoplastic polymer by heating the thermoplastic above its glass-transition temperature, and then letting it flow over or into the thermoset polymer component. This flow coating or encapsulation is not a chemical bond or fusion weld but rather a mechanical attachment formed over a large surface area between the two materials. However, poor bond strengths generally result from simple flow coating or encapsulation. In addition, surface finish, thickness, and appearance of the thermoplastic may be negatively impacted after the joining process.

Co-cure heating methods are known (see, for example, EP1423256B1). In this approach, the joint consists of a thermoplastic polymer and an initially uncured thermosetting polymer component. Heat is then applied to both melt the thermoplastic and cure the thermoset at the same time. If the glass-transition temperature of the thermoplastic and the cure temperature of the thermoset are similar, then both materials will flow upon heating and form a mixed thermoset-thermoplastic interface at the joint. While this approach may provide a joint with superior mechanical strength as compared to the encapsulation method above, its utility is limited because it requires the thermoplastic and thermoset to have very similar glass-transition and cure temperatures, respectively. Additionally, because the thermoset must be thermally cured for this method to work, it cannot be applied to materials with alternative cross-link initiation methods such as the above-described micro-truss structures which use a UV-curable polymer.

Particle-insertion methods may also be employed (see, for example, U.S. Pat. No. 7,645,642). In this approach, functionalized particles (e.g. glass spheres) are inserted into the thermoplastic and thermoset polymer components individually. When the thermoset and thermoplastic components are placed into contact and heated, the spheres melt and flow across the interface, to apparently bond the functionalized glass spheres both to themselves and to the thermoset/thermoplastic materials. Such an approach has an obvious limitation in that it requires a parasitic material phase to be introduced in order to form the bond. Furthermore, these glass particulates may spoil the surface finish and appearance of the thermoplastic material since they must be uniformly loaded throughout the thermoplastic in order for this method to be accomplished.

In the case where the substrate is a thermoplastic and the bonding polymer is a thermoplastic, conventional methodologies for joining two thermoplastic components can be used. One option is to heat the two thermoplastic materials past their glass-transition temperature, apply pressure to promote flow of material across the interface to be bonded, and then cool both components below the glass-transition temperature to solidify the joint. In this method, generally referred to as fusion welding, heating can be accomplished either directly (e.g. with an oven or torch) or indirectly (e.g. RF induction heating, vibration welding, or ultrasonic welding).

Thermosetting materials cannot be joined in this manner, however, since heating of these materials will not result in flow of the material due to the cross-linked nature of a thermoset. Consequently, a cured thermoset-thermoplastic polymer joint cannot be produced using direct or indirect fusion methods in the prior art, a deficiency which needs to be remedied.

It is desired to avoid concurrent melting and curing of the thermoplastic/thermoset interface, as well as to avoid insertion of a third parasitic material phase to form a bonded interface.

SUMMARY OF THE INVENTION

The present invention addresses the aforementioned needs in the art, as will now be summarized and then further described in detail below.

In some variations, the invention provides a polymer-based microlattice structure comprising:

(a) a first substrate layer;

(b) a plurality of intersecting micro-truss structural elements each comprising a thermoset first polymer; and (c) a continuous coating layer that substantially encapsulates each of the micro-truss structural elements, wherein the coating layer comprises a second polymer, wherein the second polymer in the continuous coating layer bonds (such as chemically or physically or both) the first substrate layer to the thermoset first polymer.

In some embodiments, the micro-truss structural elements are architecturally ordered and the coating layer is uniformly distributed within the microlattice structure.

The coating layer is bonded with the first substrate layer to form a coating/substrate bond area, and the coating layer may substantially encapsulate the micro-truss structural elements to form a coating/micro-truss contact area. In some embodiments, the coating/substrate bond area is less than the coating/micro-truss contact area. For example, the ratio of the coating/substrate bond area to the coating/micro-truss contact area may be about 0.2 or less.

In some embodiments, the ratio of average thickness of the coating layer to average micro-truss structural element effective diameter is about 5 or less, such as about 0.0001, 0.0005, 0.001, 0.005, 0.01, 0.05, 0.1, 0.5, 1, or 2.

In some embodiments, the second polymer in the continuous coating layer chemically bonds the first substrate layer to the thermoset first polymer. Preferably the microlattice structure does not contain an adhesive material, other than the coating layer, between the micro-truss structural elements and the first substrate layer.

In these or other embodiments, the second polymer in the continuous coating layer physically bonds the first substrate layer to the thermoset first polymer. Preferably the microlattice structure does not contain mechanical joints between the micro-truss structural elements and the first substrate layer.

In certain embodiments, the microlattice structure further comprises a second substrate layer that is disposed distally from the first substrate layer, wherein the second polymer in the continuous coating layer chemically and/or physically bonds the second substrate layer to the thermoset first polymer.

The first substrate layer (and the second substrate layer, when present) may include a thermoplastic material. In these or other embodiments, the substrate layers may include a non-thermoplastic material selected from the group consisting of a thermoset polymer, a metal, a ceramic, and combinations or composites thereof.

The second polymer (in the coating layer) may include a thermoset polymer, a thermoplastic polymer, or a mixture of a thermoset polymer and a thermoplastic polymer. In some embodiments, the coating layer further contains magnetically active particles or domains, and/or other additives.

The microlattice structure may have higher toughness compared to an otherwise-identical microlattice structure without the coating layer. Also, the microlattice structure may have higher glass-transition temperature compared to an otherwise-identical microlattice structure without the coating layer. The microlattice structure may also have higher chemical resistance compared to an otherwise-identical microlattice structure without the coating layer.

Some variations of the invention provide a method of forming a polymer-based microlattice structure, the method comprising:

(a) providing a first substrate layer;

(b) fabricating a plurality of intersecting (and optionally architecturally ordered) micro-truss structural elements each comprising a thermoset first polymer;

(c) substantially encapsulating each of the micro-truss structural elements with a continuous coating layer, wherein the coating layer comprises a second polymer; and (d) chemically and/or physically bonding the second polymer in the continuous coating layer to the first substrate layer, thereby connecting the thermoset first polymer with the first substrate layer.

In some embodiments, the coating layer is bonded with the first substrate layer to form a coating/substrate bond area, wherein the coating layer substantially encapsulates the micro-truss structural elements to form a coating/micro-truss contact area, and wherein the coating/substrate bond area is less than the coating/micro-truss contact area. In certain embodiments, the ratio of the coating/substrate bond area to the coating/micro-truss contact area is about 0.2 or less.

The method may further include providing a second substrate layer that is disposed distally from the first substrate layer, and chemically and/or physically bonding the second polymer in the continuous coating layer to the second substrate layer, thereby connecting the thermoset first polymer with the second substrate layer.

The first substrate layer may include a thermoplastic material and/or a non-thermoplastic material selected from the group consisting of a thermoset polymer, a metal, a ceramic, and combinations or composites thereof. In some embodiments, the second polymer (in the coating layer) is a thermoset polymer and/or a thermoplastic polymer. The coating layer may contain one or more non-polymer additives or components. For example, the coating layer further contains magnetically active particles or domains, in some embodiments.

DETAILED DESCRIPTION OF EMBODIMENTS OF THE INVENTION

The compositions, systems, and methods of the present invention will be described in detail by reference to various non-limiting embodiments.

This description will enable one skilled in the art to make and use the invention, and it describes several embodiments, adaptations, variations, alternatives, and uses of the invention. These and other embodiments, features, and advantages of the present invention will become more apparent to those skilled in the art when taken with reference to the following detailed description of the invention in conjunction with the accompanying drawings.

As used in this specification and the appended claims, the singular forms "a," "an," and "the" include plural referents unless the context clearly indicates otherwise. Unless defined otherwise, all technical and scientific terms used herein have the same meaning as is commonly understood by one of ordinary skill in the art to which this invention belongs.

Unless otherwise indicated, all numbers expressing conditions, concentrations, dimensions, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phase "consisting essentially of" limits the scope of a claim to the specified elements or method steps, plus those that do not materially affect the basis and novel characteristic(s) of the claimed subject matter.

With respect to the terms "comprising," "consisting of," and "consisting essentially of," where one of these three terms is used herein, the presently disclosed and claimed subject matter may include the use of either of the other two terms. Thus in some embodiments not otherwise explicitly recited, any instance of "comprising" may be replaced by "consisting of" or, alternatively, by "consisting essentially of"

This disclosure describes an open-cellular thermoset polymer microlattice material that is coated with a continuous polymer material. Variations of this invention allow for a thermosetting polymer microlattice to be joined to a substrate, while also improving some property of the microlattice (e.g. toughness or chemical resistance).

The formation of a polymer microlattice structure, as described in U.S. Pat. No. 7,382,959, generally requires a thermosetting (cross-linked) polymer. Various polymers that have been utilized for this process have been described in U.S. Pat. No. 8,017,193, and U.S. patent application Ser. No. 13/624,932, each of which are hereby incorporated by reference herein. The thermosetting polymers used to form the microlattice are specifically chosen for their ability to propagate, when exposed to UV radiation, along a waveguide to create a lattice network.

It may be necessary or desirable to both improve the properties of the microlattice beyond thermosetting material properties, and also bond the microlattice to some sort of substrate. In this case, different polymer materials need to be applied to the microlattice. Thermoplastic polymers have the ability to be temperature (fusion) bonded or dissolved in solvent solutions. They can provide a high-toughness bond between the microlattice and the substrate (bond surface) when applied and cured. Many thermosetting polymers, beyond those that are compatible with the microlattice formation process, are available as the continuous polymer coating material.

The continuous polymer coating material may serve multiple functions. The continuous coating layer may have substantially different properties than what is achievable with the thermoset polymer in the microlattice. Also, the continuous coating layer provides a bond between the thermoset microlattice and a substrate layer. In some embodiments, the polymer coating layer is present over the entire microlattice surface area, thereby increasing the bond area between the coating layer and the microlattice. This increased bond area can provide improved toughness.

The coating layer may be a thermoset or thermoplastic. An example thermoset coating layer is produced by incorporating a chemically resistant thermoset polymer, such as an epoxy, over the entire surface area of a prefabricated microlattice, such that it continuously coats the microlattice. Then, after contacting the coated microlattice with the substrate, the thermoset coating can be cured, such as by heating. The cured epoxy will bond the microlattice to the substrate as well as provide chemical resistance to the microlattice. Chemical resistance may include resistance to attack from an oxidizer, which could otherwise degrade the microlattice thermoset polymer.

An example thermoplastic coating layer is produced by incorporating a tough thermoplastic polymer, such as acrylonitrile-butadiene-styrene (ABS) over the entire surface area of a prefabricated microlattice, such that it continuously coats the microlattice. Then, the microlattice may be bonded to a substrate by solvent wetting, direct melting, or induced melting of the thermoplastic coating that is between the thermoset microlattice and the substrate. In one embodiment, the substrate is also a thermoplastic material.

By coating a polymer material onto a previously formed polymer microlattice, a strong bond between the microlattice, thermoset polymer, and the substrate can be formed. In some embodiments, an ordered microlattice architecture ensures uniform loading of the polymer material throughout the microlattice network. This spreads the adhesion force evenly over the entire surface area of the microlattice. By contrast, a non-uniform loading (concentration) of thermoplastic bonding polymer throughout the microlattice will lead to regions of the material that are susceptible to premature failure or de-bonding, Such non-uniform loading results, for instance, after applying the bonding polymer at only the substrate contact points.

Another advantage of the continuous polymer coating combined with the thermoset polymer in the microlattice configuration is that the continuous polymer coating may be selected such that it has a glass-transition temperature ($T_g$) that is similar or significantly different that the $T_g$ of the thermosetting polymer. This enables another design parameter ($T_g$) that will influence the physical properties as a function of temperature. A thermoplastic continuous polymer coating may be fusion-bonded by direct heating or induced heating, for example, while leaving the integrity of the microlattice intact. Notably, this invention does not require the thermoplastic glass-transition temperature to be similar to the thermoset cure temperature.

This new technique is effective to bond the polymer cellular (porous) materials with three-dimensional microstructure to substrates. Microlattices and possible methods to fabricate them, in some embodiments, are described in U.S. Pat. No. 7,382,959, which has been incorporated by reference.

One method for solvent coating with a thermoplastic is described in U.S. patent application Ser. No. 14/197,038 filed Mar. 4, 2014 for "THERMOPLASTIC REINFORCED MICRO-TRUSS MATERIALS" (Eckel et al.), which is incorporated by reference herein. A microlattice is described which is bonded to a substrate on at least one side. The bonding material consists of a polymer and the microlattice consists of thermoset polymer. The bond is created by coating the microlattice in the desired polymer, and then solidifying, drying, or curing the polymer coating, while in contact with the substrate to create adhesion to both the microlattice and the substrate.

For coating the microlattice with a thermoplastic, a solution of thermoplastic may be formed in solvent, as also described in U.S. patent application Ser. No. 14/197,038. Liquid extraction may remove the primary thermoplastic solvent by soaking, rinsing, and/or washing in a secondary solvent. The thermoplastic is not soluble in the secondary solvent but the primary solvent is soluble. An example of a thermoplastic solution with applicable secondary solvents would be ABS polymer selected as the thermoplastic, dissolved in acetone as the primary solvent. To remove the acetone but leave the ABS polymer, water or isopropyl alcohol (IPA) may be used to extract the acetone through soaking or rinsing.

In some embodiments, a polymer blend gradient, or a semi-interpenetrating polymer network ("sIPN"), may be formed at the adhesion layer between the thermoset microlattice and its continuous polymer coating, as described in U.S. patent application Ser. No. 14/197,038. In an sIPN, one or more polymers are cross-linked and one or more polymers are linear or branched. The sIPN promotes adhesion of the polymer coating to the thermoset microlattice, which increases the strength of the bond.

The present invention does not require melting and flow of the thermoplastic above its glass-transition temperature—an important feature if the surface finish, thickness, or appearance of the thermoplastic is to be maintained after the joining process. Furthermore, this invention provides a means for fusion-welding a thermosetting polymer (the microlattice) to a thermoplastic, resulting in a much stronger bond than that formed by simple flow coating or encapsulation.

The present invention also does not require a parasitic material phase to be introduced in order to form a bond. Glass or other particulates may spoil the surface finish and appearance of the thermoplastic material, since they must be uniformly loaded throughout the thermoplastic in such a method.

Variations of the invention do not require large-scale flow of the thermoplastic material, concurrent melting and curing of the thermoplastic/thermoset interface, and/or insertion of a third parasitic material phase to form the bonded interface. Therefore, this method has applicability to a wide range of materials and can be utilized for thermoplastic materials for which surface finish, flatness, or thickness tolerances are critical (such as in Class A automotive trim components). Additionally, it should be noted that the present method allows for UV-curable polymer microlattice materials to be joined to a thermoplastic material without the use of a secondary adhesive material or a mechanical attachment.

Some variations of the invention are predicated on exploiting the uniformity of a three-dimensional microlattice structure to achieve a continuous coating of polymer uniformly distributed across the entire surface area of the microlattice. The continuous coating of polymer creates a bonding surface area of the microlattice substantially larger than that of the substrate. The bonding material is not solely concentrated at the microlattice contact points to the substrate. The continuous coating may also improve the properties of the thermoset polymer microlattice.

Furthermore, this approach allows for joining of a thermoset polymer microlattice to a thermoplastic component without (i) significant flow of the thermoplastic, (ii) matched thermoset cure temperature and thermoplastic glass-transition temperature, or (iii) addition of a third parasitic material phase to form the interfacial joint. As such, the present invention satisfies a long-felt need for enhancing the stiffness of thermoplastic components for which surface finish, smoothness, or appearance is a concern.

In some variations, the invention provides a polymer-based microlattice structure comprising:

(a) a first substrate layer;

(b) a plurality of intersecting micro-truss structural elements each comprising a thermoset first polymer; and (c) a continuous coating layer that substantially encapsulates each of the micro-truss structural elements, wherein the coating layer comprises a second polymer, wherein the second polymer in the continuous coating layer bonds (such as chemically or physically or both) the first substrate layer to the thermoset first polymer.

"Microlattice" and "micro-truss" refer to cellular architectures pioneered by HRL Laboratories (Malibu, Calif.). "Microlattice" structures generally mean cellular architectures fabricated with significant open volumes between micro-trusses. "Micro-trusses" mean structural materials, within a microlattice, that can be tailored for ultra-high strength, variable stiffness, engineered thermal expansion, and embedded multi-functionality.

In preferred embodiments, the micro-truss structural elements are architecturally ordered (such as in FIG. 1) and the coating layer is uniformly distributed within the microlattice structure. By "architecturally ordered" (or "architectural order") it is meant that the micro-truss elements form a regular plurality of elements whose effective diameters are each substantially the same and whose spacing between any adjacent elements are all substantially the same. In some embodiments, the micro-truss elements intersect at a plurality of nodes, wherein the separation between two adjacent nodes is less than 20 times (such as about 15, 10, or 5) the average effective diameter of micro-truss elements.

In some embodiments, the micro-truss structural elements lack architectural order, or contain regions that lack architectural order while other regions are architecturally ordered. The lack of architectural order may arise from defects during synthesis, or may be intentional, in some embodiments. Also, the overall structure may have architectural order that contains multiple regions each having architectural order but characterized by different micro-truss diameters or spacing between micro-truss elements in the different regions, or multiple regions with varying architectural order along with one or more disordered or random structural regions.

Figure 1:
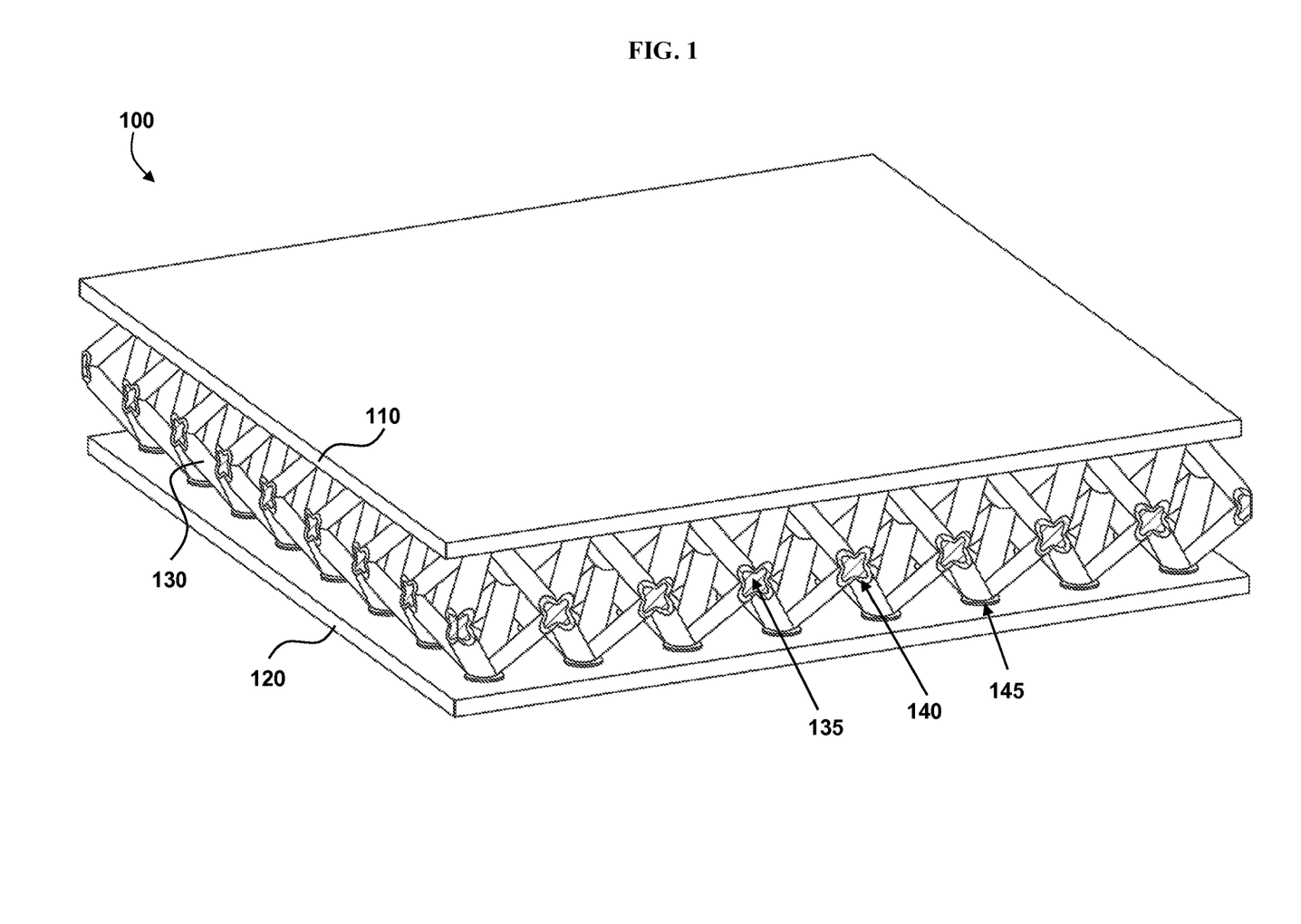
FIG. 1 is a three-dimensional rendering of a microlattice structure including coated a micro-truss structure comprising a polymer, bonded to substrate layers, according to some embodiments.
Figure 2:
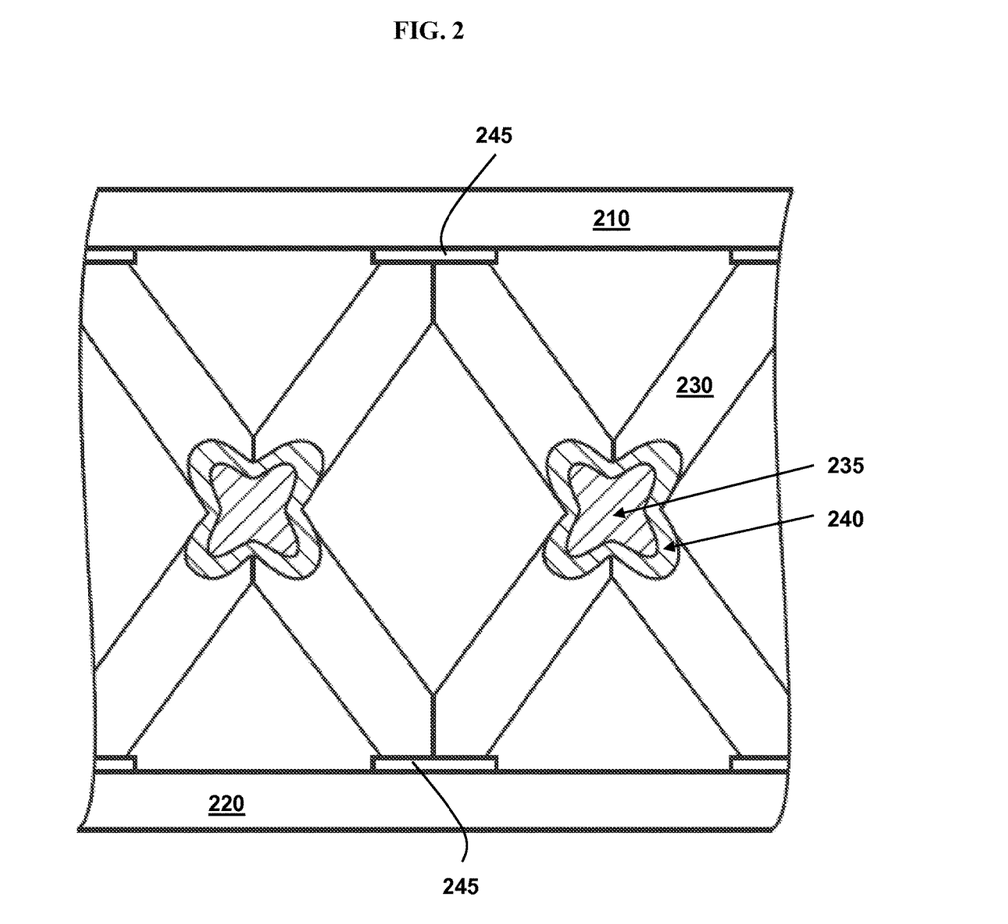
FIG. 2 is a side view of the microlattice structure of FIG. 1, depicting the micro-truss structure coated with a polymer coating and bonded to substrate layers.
Figure 3:
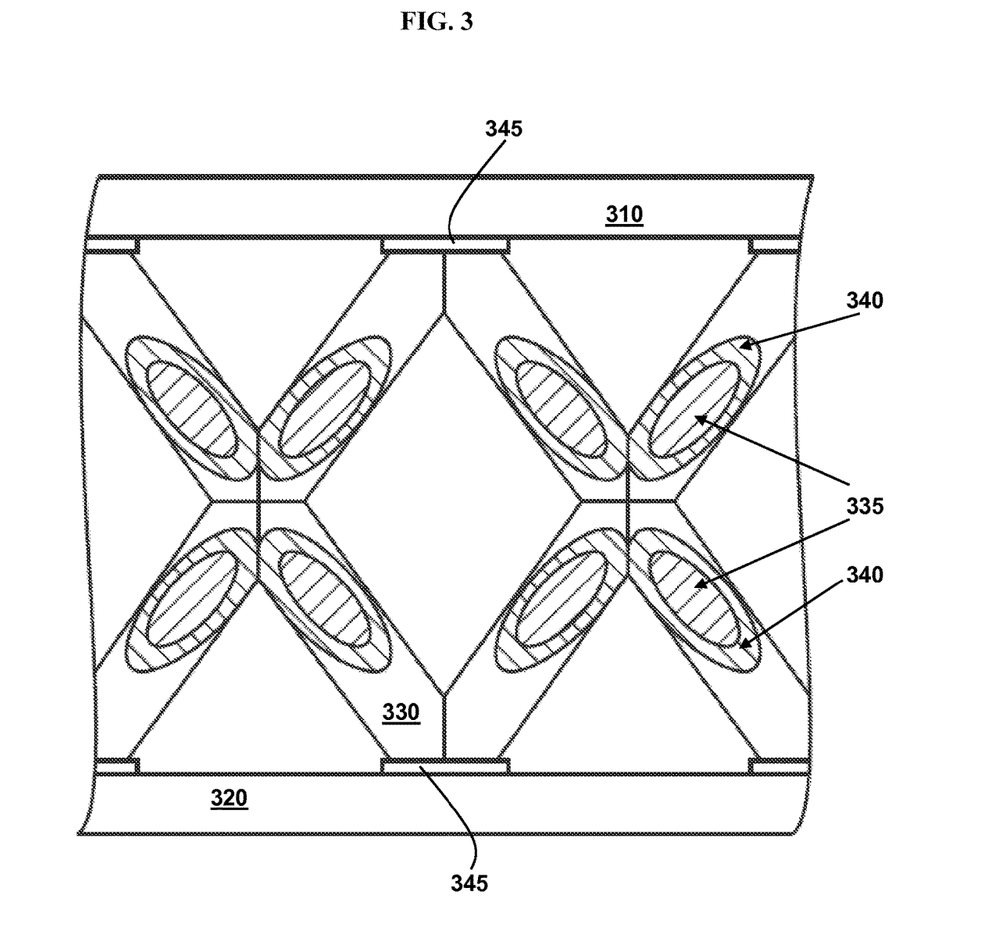
FIG. 3 is a side view with cutaway of the microlattice structure of FIG. 1, depicting the micro-truss structure coated with a polymer coating and bonded to substrate layers.

FIGS. 1-3 depict exemplary microlattice structures of the invention. FIG. 1 is a three-dimensional rendering of a microlattice structure 100 including coated a micro-truss structure 130, comprising a polymer 135, bonded to substrate layers 110, 120. In FIG. 1, micro-truss structure 130 is coated with a polymer coating 140 and then bonded to substrate layers 110, 120 at the top nodes (not shown) and bottom nodes 145, respectively. Coating increases the surface area across the microlattice.

FIG. 2 is a side view of the microlattice structure 100 of FIG. 1. In FIG. 2, the micro-truss structure 230, comprising a polymer 235, is coated with a polymer coating 240 and then bonded to substrate layers 210, 220 at the top and bottom nodes 245. Coating increases the surface area across the microlattice.

FIG. 3 is a side view with cutaway of the microlattice structure 100 of FIG. 1. In FIG. 3, the micro-truss structure 330, comprising a polymer 335, is coated with a polymer coating 340 and then bonded to substrate layers 310, 320 at the top and bottom nodes 345. This drawing shows the thermoset microlattice template 330 continuously coated with polymer 340 which spreads the bonding surface area 345.

The coating layer 140 is bonded with the first substrate layer 120 to form a coating/substrate bond area 145, and the coating layer 140 may substantially encapsulate the micro-truss structural elements 130 to form a coating/micro-truss contact area (140 on 135). In some embodiments, the coating/substrate bond area is less than the coating/micro-truss contact area. For example, the ratio of the coating/substrate bond area to the coating/micro-truss contact area may be about 1, 0.9, 0.8, 0.7, 0.6, 0.5, 0.4, 0.3, 0.2, 0.1, or less. In certain embodiments, the ratio of the coating/substrate bond area to the coating/micro-truss contact area is about 0.2 or less.

In some embodiments, the ratio of average thickness of the coating layer 140 to average micro-truss structural element 130 effective diameter is about 5 or less, such as about 4, 3, 2, 1, 0.5, 0.2, 0.1, 0.05, 0.01, 0.005, 0.001, 0.0005, or 0.0001. To illustrate this ratio, in FIG. 2 (which is not necessarily drawn to scale), the ratio of average thickness of the coating layer 240 to average effective diameter of micro-truss structural element 230 is about 0.2 to 0.3. As another example with a very thin coating, the effective diameter may be about 2 mm while the coating thickness is about 1 micron, resulting in a ratio of 0.0005. Note that the maximum ratio will depend on the spacing between micro-truss elements (i.e. the separation between two adjacent nodes of intersection of micro-truss elements).

When the separation between two adjacent nodes is relatively large, such as 10 or higher, then higher ratios of coating thickness to micro-truss diameter are possible and may be preferred in some embodiments. Again referring to FIG. 2 to illustrate, the separation between two adjacent nodes of intersection of micro-truss elements is depicted to be about 3 to 4, and in this case the maximum ratio of coating thickness to micro-truss diameter may be about 2. In some embodiments, the ratio of coating thickness to micro-truss diameter is the (maximum) ratio corresponding to completely filled spaces between the micro-truss elements. In such embodiments, the continuous coating layer may be regarded as a "continuous matrix" that coats the micro-truss structural elements is interconnected with itself within the space between micro-truss elements.

In certain embodiments, the invention provides a polymer-based microlattice structure comprising:
(a) a first substrate layer;
(b) a plurality of intersecting micro-truss structural elements each comprising a thermoset first polymer; and
(c) a continuous matrix that substantially encapsulates each of the micro-truss structural elements, wherein the coating layer comprises a second polymer,
wherein the second polymer in the continuous matrix bonds (such as chemically or physically or both) the first substrate layer to the thermoset first polymer.

In some embodiments, the second polymer in the continuous coating layer 140 chemically bonds the first substrate layer 120 to the thermoset first polymer 135. Preferably the microlattice structure does not, however, contain an adhesive material, other than the coating bond layer 145, between the micro-truss structural elements and the first substrate layer 120.

In these or other embodiments, the second polymer in the continuous coating layer 140 physically bonds the first substrate layer 120 to the thermoset first polymer 135. Preferably the microlattice structure does not, however, contain mechanical joints between the micro-truss structural elements 130 and the first substrate layer 120.

In certain embodiments, the microlattice structure further comprises a second substrate layer 110 that is disposed distally from the first substrate layer 120 (such as depicted in FIG. 1). The second polymer in the continuous coating layer 140 chemically and/or physically bonds the second substrate layer 110 to the thermoset first polymer 135.

The first substrate layer 120 (and the second substrate layer 110, when present) may include a thermoplastic material. In these or other embodiments, the substrate layers 110, 120 may include a non-thermoplastic material selected from the group consisting of a thermoset polymer, a metal, a ceramic, and combinations or composites thereof.

The second polymer (in the coating layer 140) may include a thermoset polymer, a thermoplastic polymer, or a mixture of a thermoset polymer and a thermoplastic polymer. In some embodiments, the coating layer 140 further contains magnetically active particles or domains, and/or other additives.

The microlattice structure 100 may have higher toughness compared to an otherwise-identical microlattice structure without the coating layer. For example, the toughness may be increased by 5%, 10%, 20%, or more, using the continuous coating layer as described herein.

Also, the microlattice structure 100 may have higher glass-transition temperature compared to an otherwise-identical microlattice structure without the coating layer. For example, $T_g$ may be increased by 2° C., 5° C., 10° C., 20° C., or more, using the continuous coating layer as described herein.

The microlattice structure 100 may also have higher chemical resistance compared to an otherwise-identical microlattice structure without the coating layer.

In some embodiments, the micro-truss structural elements 130 further comprise various additives which may further modify one or more properties, including chemical, physical/mechanical, electrical properties.

In some variations, the invention provides a polymer-based microlattice intermediate comprising:
a plurality of intersecting micro-truss structural elements each comprising a thermoset first polymer; and
a continuous coating layer that substantially encapsulates each of the micro-truss structural elements, wherein the coating layer comprises a second polymer,
wherein the second polymer in the continuous coating layer is capable of chemically and/or physically bonding the first substrate layer to the thermoset first polymer.

Free-radical polymerization of unsaturated species is a well-known field of polymer chemistry. Free-radical polymerization is typically accomplished through generation of a radical species thermally, photochemically, or by ionizing radiation. Radicals (also referred to as free radicals) are atoms, molecules, or ions with unpaired electrons. An unsaturated compound is any organic compound that contains a derivative of ethylene ($H_2C=CH_2$) with one or more hydrogen atoms replaced with some other group(s). Reaction of the radical species with an unsaturated group will produce a larger molecule containing a carbon radical that is, in turn, capable of reacting with another unsaturated monomer. Repetition of this reaction produces a growing linear chain, provided there is adequate stabilization for the growing radical species.

Photopolymers undergo a refractive index change during the polymerization process that can lead to the formation of polymer optical waveguides. If a monomer that is photosensitive is exposed to light (e.g., UV light) under the right conditions, the initial area of polymerization (e.g., a small circular area) will trap the light and guide it to the tip of the polymerized region, further advancing that polymerized region. This process will continue, leading to the formation of a waveguide structure with approximately the same cross-sectional dimensions along its entire length. This phenomenon may be applied to form an interconnected pattern of self-propagating polymer waveguides. The polymeric waveguides may be configured into a three-dimensional micro-truss structure.

Formation of self-propagating polymeric waveguides relies on the ability to form high-molecular-weight networks in specific spatial regions of a resin mixture, while leaving remaining monomer largely unreacted. Initiators that will dissociate under exposure to UV radiation provide a source of radical species to create polymeric waveguides. However, the rapid kinetics and exothermic nature of free-radical polymerizations often releases enough heat to thermally decompose photolabile initiators. This process can lead to formation of polymer outside of the volume of resin directly illuminated with light.

This problem can be overcome to suppress runaway thermal polymerization of a photopolymerizable resin. This is desirable in a system such as a micro-truss structure, in contrast to a single waveguide. In particular, in a micro-truss structure, multiple self-propagating waveguides comprising a large volume fraction of the overall resin may be formed simultaneously and may generate heat sufficient to thermally decompose initiating species.

Polymer resin systems based on thiol-ene polymerization appropriate for formation of self-propagating polymer waveguides are not as susceptible to the rapid rise of heating within the polymer resin upon UV illumination. There is a fundamentally different polymerization mechanism and kinetics in thiol-ene polymerization systems.

Some variations utilize a formulation for forming self-propagating polymer optical waveguides, the formulation comprising at least one molecule containing one or more unsaturated carbon-carbon bonds; an effective amount of a photoinitiator for initiating a free-radical polymerization; an effective amount of a free-radical inhibitor for controlling the free-radical polymerization; and optionally a solvent or unreactive diluent.

The formulation is essentially free of thiol groups, in some embodiments, which means that the thiol concentration in the formulation is either zero or is insignificant in terms of final polymer properties. It should be recognized that thiol impurities may be present or that a thiol-based additive may be introduced for reasons other than to serve as a monomer for polymerization.

The molecule containing one or more unsaturated carbon-carbon bonds may be a monomer or an oligomer, i.e. it may be partially polymerized already. The unsaturated carbon-carbon bonds may be double bonds, triple bonds, or a combination thereof. Any molecule containing one or more unsaturated carbon-carbon bonds, which is susceptible to free-radical initiation and thus capable of being polymerized, may be utilized.

According to some embodiments, appropriate monomers for free-radical reactions can be selected from (but not limited to) ethylene, substituted olefins, halogenated olefins, 1,3-dienes, styrene, α-methyl styrene, vinyl esters, acrylates, diacrylates, triacrylates, methacrylates, acrylonitriles, acrylamides, N-vinyl carbazole, N-vinyl pyrolidone, or combinations thereof. Exemplary monomers include, for example, tris(2-hydroxyethyl) isocyanurate triacrylate, dipentaerythritol pentaacrylate, polyethylene glycol diacrylate, trimethylolpropane triacrylate, and combinations or derivatives thereof.

Substituted olefins may include single atoms in place of hydrogen, such as fluorine or chlorine, or groups such as alkyl groups, esters, amine groups, hydroxyl groups, or cyano groups. One or more double bonds or triple bonds can be present in the unsaturated molecules. Also, they can contain different combination of these different multiple bonds. Different structures exhibit different reaction rates. Since various combinations of double or triple bonds may be used in the polymerization process, polymer systems with very different physical properties can be created.

While monomer species with a single unsaturated group are typically capable of forming linear chains, the formation of a solid high-molecular-weight material may be rapidly accelerated through the incorporation of monomer species with multiple polymerizable unsaturated groups, such as diacrylates, tricrylates, or larger acrylates.

The photoinitiator for initiating a free-radical polymerization is any compound which can generate free radicals under light by either intramolecular bond cleavage or intermolecular hydrogen abstraction. One or more different types of photoinitiators may be used in the polymerization process and usually result in different reaction rates. Examples include, but are not limited to, 2-hydroxy-2-methylpropiophenone, camphorquinone, benzophenone, benzoyl peroxide, 2,2-dimethoxy-2-phenylacetophenone, azobisisobutyronitrile, or combinations thereof.

Photoinitiators may be present up to about 10 wt % of the total weight of the polymer. Preferably, the concentration of photoinitiators is less than about 5 wt % or less than about 2 wt %, such as from about 0.01 wt % to about 0.1 wt %. Exemplary photoinitiator concentrations include about 0.01 wt %, 0.02 wt %, 0.05 wt %, 0.075 wt %, 0.1 wt %, 0.2 wt %, and 0.5 wt % of the total weight of the polymer.

In a photoinitiator, free radicals are generated by the photoinitiator when exposed to an appropriate wavelength of light, such as a wavelength selected from about 200 nm to about 500 nm. Specific wavelengths may be selected, for example, from about 365-366 nm, 385 nm, 395 nm, and 404-405 nm. The source of light may vary, such as fluorescent lamps (e.g. mercury arc lamps) or semiconductor light sources (e.g., light-emitting diodes).

Free-radical inhibitors are components that aid in the suppression of unwanted polymerization outside of light-illuminated regions. A free-radical inhibitor added to the monomeric formulation reduces unwanted polymerization of the regions outside the optical waveguide. Polymerization of the unexposed regions outside the waveguide may occur from residual heat generated from the polymerization reaction or from light that leaks out of the waveguide during light exposure.

Exemplary materials for the free-radical inhibitor may be selected from hydroquinone, methylhydroquinone, ethylhydroquinone, methoxyhydroquinone, ethoxyhydroquinone, monomethylether hydroquinone, propylhydroquinone, propoxyhydroquinone, tert-butylhydroquinone, n-butylhydroquinone, or combinations thereof.

The free-radical inhibitor concentration may selected to be between 0 wt % and 5 wt % by weight of the polymer, such as from about 0.005 wt % to about 1 wt %, or about 0.01 wt %, 0.05 wt %, 0.1 wt %, 0.2 wt %, 0.4 wt %, 0.5 wt %, 0.75 wt %, or 0.9 wt % of the total weight of the polymer.

Dilution of polymerizable resin may be accomplished with an appropriate solvent or diluent. In some embodiments, a solvent for the selected monomer is utilized. In other embodiments, there is no intentional solvent added (neat polymerization). The choice of solvent may vary widely, such as (for example) cyclohexane, toluene, 1,4-dioxane, xylene, anisole, DMF, DMSO, water, ethanol, methanol, acetone, acetonitrile, chloroform, bulk monomer, derivatized monomer, or combinations thereof.

Free-radical polymerizations of unsaturated monomers can be susceptible to $O_2$ because it acts to scavenge (deactivate) active radical chain ends. As a result, it may be desirable to remove dissolved $O_2$ from the monomer resin. This may be accomplished, for example, by evacuation of the resin mixture or delivering a continuous stream of inert gas (e.g. $N_2$, $CO_2$, or Ar) through the resin mixture for a fixed time period before exposure to light.

The formation of a polymer waveguide requires an index of refraction change between the liquid monomer and the solid polymer. To enable self-propagation of the polymer waveguide, the polymer should be transparent to the wavelength(s) of the light that will be used to generate free radicals and induce polymerization. In addition to these requirements, the reaction should stop, or significantly slow down, when the light exposure is off to avoid over-curing of the monomer that surrounds the polymer waveguide.

In some variations of this invention, a plurality of self-propagating polymer waveguides are created simultaneously using multiple collimated beads of light with a significantly higher volume fraction of the resin under direct illumination compared to a single-strand polymer waveguide. This generates significantly greater heat per total resin volume. The level of heat generated from the polymerization in the illuminated region can lead to undesirable thermal runaway polymerization outside of the illuminated regions and poor fidelity of the final structure with the intended dimensions. In order to prevent unwanted thermally based polymerization in areas not under illumination, thermal decomposition of initiators should be mitigated. This can be accomplished by addition of inhibitor species into the resin and/or by introduction of a solvent such as water capable of absorbing heat and reducing temperature rise.

Some embodiments can create a polymer cellular material with an ordered 3D microstructure by creating a pattern of self-propagating optical waveguides in an appropriate photopolymer. Forming single polymer waveguides as well as patterning these polymer waveguides to form an ordered 3D microstructure containing a plurality of self-propagating polymer waveguides, in some embodiments, is described in U.S. Pat. No. 7,382,959 issued Jun. 3, 2008 to Jacobsen, which has been incorporated by reference.

In some embodiments, a fixed light input (e.g., collimated UV light) is used to cure (polymerize) polymer optical waveguides, which can self-propagate in a 3D pattern. The propagated polymer optical waveguides form an ordered 3D microstructure or micro-truss that can be polymerized without anything moving during the formation process, to enable large-scale, inexpensive production.

In some embodiments, 3D microstructures or other ordered polymer microstructures (including two-dimensional structures) may be designed for a given application. Design parameters may include: the angle and pattern of the polymer waveguides with respect to one another; the packing, or relative density of the resulting cellular structure (the open volume fraction); and the cross-sectional shape and dimensions of the polymer waveguides.

A 3D polymer microstructure may be formed in the area exposed to the incident collimated light beam. Since the incident light and the monomer remain fixed with respect to one another during the formation of a polymer waveguide, the exposure area of the collimated beam(s) may be scanned over a larger surface area of monomer, leading to the formation of large-area structures. Once the polymer cellular structure is formed in the volume of monomer, the remaining unpolymerized material (monomer) is removed, leaving an open cellular polymer material that is the ordered 3D microstructure. A solvent that will dissolve the monomer, but does not dissolve the polymer, may be used to aid in the monomer removal. In certain embodiments, monomer may continuously be fed under a fixed incident light pattern, created from a mask and collimated light.

Generally, multiple polymer waveguides may be created from multiple exposure times using a single collimated beam and a mask with a single aperture and moving the collimated beam with respect to the mask between each exposure. Alternatively, or additionally, multiple polymer waveguides may be created from a single exposure time using multiple collimated beams at different incident angles and a mask with a single aperture.

A three-dimensional ordered polymer microstructure may be fabricated from multiple polymer waveguides that are created from a mask with multiple apertures. The shape and dimensions of the polymer waveguides are dependent on the shape and dimensions of the aperture(s) in the mask. The relative angles of the waveguides in the 3D structure are dependent on the incident angles of the collimated beam. The lengths of the individual polymer waveguides are dependent on the photopolymer and the light source. The area of exposure of the collimated beam(s) and the monomer may be moved with respect to each other to create a structure that is larger than the available exposure area.

In some embodiments, micro-truss structural elements as described in detail above may be fabricated by such waveguide techniques, or obtained from another source as a micro-truss starting structure, or some combination thereof.

Some variations of the invention provide a method of forming a polymer-based microlattice structure, the method comprising:

(a) providing a first substrate layer;

(b) fabricating a plurality of intersecting (and optionally architecturally ordered) micro-truss structural elements each comprising a thermoset first polymer;

(c) substantially encapsulating each of the micro-truss structural elements with a continuous coating layer, wherein the coating layer comprises a second polymer; and (d) chemically and/or physically bonding the second polymer in the continuous coating layer to the first substrate layer, thereby connecting the thermoset first polymer with the first substrate layer.

In some embodiments, the coating layer is bonded with the first substrate layer to form a coating/substrate bond area, wherein the coating layer substantially encapsulates the micro-truss structural elements to form a coating/micro-truss contact area, and wherein the coating/substrate bond area is less than the coating/micro-truss contact area. In certain embodiments, the ratio of the coating/substrate bond area to the coating/micro-truss contact area is about 0.2 or less.

The method may further include providing a second substrate layer that is disposed distally from the first substrate layer, and chemically and/or physically bonding the second polymer in the continuous coating layer to the second substrate layer, thereby connecting the thermoset first polymer with the second substrate layer.

The first substrate layer may include a thermoplastic material and/or a non-thermoplastic material selected from the group consisting of a thermoset polymer, a metal, a ceramic, and combinations or composites thereof. In some embodiments, the second polymer (in the coating layer) is a thermoset polymer and/or a thermoplastic polymer. The coating layer may contain one or more non-polymer additives or components. For example, the coating layer further contains magnetically active particles or domains, in certain embodiments.

Some variations of the invention provide a method of forming a polymer-based microlattice structure, the method comprising:

(a) providing a first substrate layer;

(b) obtaining a plurality of intersecting (and optionally architecturally ordered) micro-truss structural elements each comprising a thermoset first polymer;

(c) substantially encapsulating each of the micro-truss structural elements with a continuous coating layer, wherein the coating layer comprises a second polymer; and (d) chemically and/or physically bonding the second polymer in the continuous coating layer to the first substrate layer, thereby connecting the thermoset first polymer with the first substrate layer.

In some methods to coat the micro-truss elements with polymer, dry coating is employed. For example, a thermoplastic powder may be selected in a form capable of being spread evenly on the micro-truss elements. Magnetically active particles may be blended with the thermoplastic powder for later use in induction heating.

A plurality of intersecting micro-truss structural elements is formed and cleaned out, but not post-cured, in some embodiments. This will leave the structure only partially cross-linked. Then the powder may be coated into the microlattice (the surface of the microlattice may be sticky). After introducing the powder, any technique which puts powder on the surface of the micro-truss structural elements may be used. For example the structure may be moved around quickly in space, or powder may be sprinkled into the micro-truss elements. The powder may also be coated using commercially available powder coating processes.

In some embodiments, only the contact points are coated with powder (e.g. by dipping), and then the thermoplastic may be melted into a continuous coating. This may be done by heating beyond the melting point with an oven, heat torch, or radiant heating. If loaded with magnetically active particles, an induction heater may be used to melt the thermoplastic. Alternatively, or additionally, the coating can be left as a powder and melted at the bonding step.

After cooling to solidify the thermoplastic as a coating on the micro-truss structural elements, the micro-truss structure may be fully cured. For example, curing may employ thermal cure heating to 160° C. in an inert atmosphere. Curing may employ exposure to high-intensity UV radiation at an effective wavelength required to cure. The curing finished cross-linking the thermoset micro-truss structure. The thermoset may cross-link around the thermoplastic molecules, creating a sIPN, in some embodiments.

In some methods to coat the micro-truss structure with polymer, wet coating is employed. For example, a thermoplastic solvent coating may be created by preparing a solvent/thermoplastic solution. Any method of wet coating can be used, such as solvent dip coating or spray coating. In solvent dip coating, a sIPN may be created by soaking and swelling in the coating solution. In spray coating, a solvent/thermoplastic solution is sprayed in an even coat on the micro-truss structure. In a micro-truss structure with large dimensions, the solvent/thermoplastic solution may be painted or brushed on.

The micro-truss structure may be dried to create a thermoplastic film or left wet with solvent. Wet coating may be useful for immediate bonding to a thermoplastic sheet. The coated micro-truss structure may be dried using ambient temperature air, a heated oven, or liquid extraction, for example.

Partially cured micro-truss structural elements may be post-cured. One technique uses thermal cure heating to 160° C. in an inert atmosphere. Another technique uses exposure to high-intensity UV radiation at an effective wavelength required to cure. The curing will finish cross-linking the thermoset micro-truss structure, and the thermoset may cross-link around the thermoplastic molecules creating a sIPN.

Wet coating of a thermoset coating may utilize similar coating methods as thermoplastic solvent coatings. For example, dip coating the microlattice in uncured thermoset resin may be employed. Spray coating of the thermoset resin may also be used. When the micro-truss structure has large dimensions, the thermoset resin may be painted or brushed on. The thermoset coating may be left uncured until the bonding step.

If desired, additional bonding polymer may be added to the contact points to improve the strength of the bond. For example a thermoplastic polymer may be used in a viscous solution to create a thicker coating useful for bonding. The solution may include magnetically active particles for induction heating. A thermoset resin may alternatively be added (as additional bonding polymer).

The substrate surface may be prepared for bonding by cleaning, sanding, roughening, scouring, or some combination thereof.

When wet bonding, the additional polymer may be applied to the microlattice contact points or to the bonding substrate. The micro-truss structure contacts may be dipped and then the additional polymer spread onto the micro-truss structure contacts and/or substrate. Pressing of wet micro-truss structure onto substrate may fuse them together. For thermoplastic bonding, solvent may be removed by extraction or drying. Once solvent is fully removed and sample is dry, a strong bond to the surface will be achieved. For thermoset bonding, curing may use induction heating, radiant heating, an oven, UV radiation, or an ambient cure. Once the thermoset is cured, a strong bond to the surface will be achieved.

When dry bonding, the additional polymer may be applied to the solvent-coated microlattice, dried microlattice, or powder-coated microlattice. Additional thermoplastic may be applied to the micro-truss structure contact points and/or to the bonding substrate. Similar methods are applicable as for wet coating of a viscous solution. Micro-truss structure contacts may be dipped and/or spread onto the microlattice contact and/or substrate. Additional thermoplastic powder may be used to create a layer on the substrate which can be melted and fused, via external heating or induction heating, for example.

The dry micro-truss structure may be pressed onto substrate to fuse them together. If there is a solvent binder, the solvent may be removed by liquid extraction or by drying. Once solvent is fully removed and sample is dry, a strong bond to the surface will be achieved. If there is a powder binder, the thermoplastic may be melted into a coating. Heating beyond the melting point may be accomplished with an oven, heat torch, or radiant heating. If loaded with magnetically active particles, an induction heater may be used to melt the thermoplastic. Once the thermoplastic is cooled and solid, a strong bond to the surface will be achieved.

Some variations provide a material system or part containing a polymer-based microlattice structure comprising:
(a) a first substrate layer;
(b) a plurality of intersecting micro-truss structural elements each comprising a thermoset first polymer; and
(c) a continuous coating layer that substantially encapsulates each of said micro-truss structural elements, wherein said coating layer comprises a second polymer,
wherein said second polymer in said continuous coating layer chemically and/or physically bonds said first substrate layer to said thermoset first polymer.

Some variations also provide a material system or part containing a polymer-based microlattice structure comprising:
(a) a first substrate layer;
(b) a second substrate layer;
(c) a plurality of intersecting micro-truss structural elements each comprising a thermoset first polymer; and
(d) a continuous coating layer that substantially encapsulates each of said micro-truss structural elements, wherein said coating layer comprises a second polymer, wherein said second polymer in said continuous coating layer chemically and/or physically bonds said first substrate layer and said second substrate layer to said thermoset first polymer.

EXAMPLE

Example: Fabrication of Polymer-Based Microlattice Structure

An example is demonstrated with the following method. A demonstrative piece of micro-truss structure used is 2"×2" and 0.5" tall. The characteristic mask diameter of the struts is 800 microns and the mask spacing from node to node is 8 mm with 4 struts defining the architecture. After creation via the waveguide process (as described herein), the microlattice is fully post-cured using a thermal cure.

A thermoplastic coating solution is made up of poly (acrylonitrile-butadiene-styrene) (ABS) which is dissolved at 15 wt % in 2-butanone (MEK) solvent at room temperature. This solution is used for coating the micro-truss structure. A second thermoplastic solution is mixed for bonding the coated micro-truss structure to a facesheet (substrate layer). The bonding solution is 50 wt % ABS also in MEK. The chosen substrate to bond the micro-truss structure is clear polycarbonate, 1/16" thick cut to 2"×2". The polycarbonate is sanded with sandpaper to increase the bonding surface area, and then cleaned with IPA.

The micro-truss structure is dip-coated in the coating solution of ABS (15 wt %). The dip-coating process consists of the following steps. The micro-truss structure is submerged in the solution so that all the surfaces are wetted. The micro-truss structure is extracted from the coating solution and the bulk of the excess coating solution is allowed to gravity drain. The micro-truss structure is then blown with air at 80 psi from a 9" air knife which clears the additional excess coating solution, removes any blockages from the channels, and creates a uniform coated surface. Then the coated micro-truss structure is soaked in IPA to extract the remaining MEK solvent via liquid extraction. The ABS is not soluble in the IPA but the MEK is soluble, so a coating of ABS remains on the micro-truss structure. After soaking in the IPA for 30 min, the micro-truss structure is extracted and the IPA is dried by blowing with air again. Then the coating process is repeated again.

Next the coated micro-truss structure is bonded to the polycarbonate facesheets on both the top and bottom planes (as in FIG. 1). The bonding solution is put into a flat container with a depth of about 1/16", enough to cover the nodes of the micro-truss structure. The nodes of the micro-truss structure on both the top and bottom faces are dipped into the bonding solution, and then sandwiched between the polycarbonate sheets. They are held together for about 1 min to allow some drying—long enough for the sandwich to stay together. Then the sandwich is left to soak in IPA for 12 hr. Afterwards it is allowed to dry for 30 min in a 100° C. oven.

A control sample is made to test an epoxy bond at just the nodes with an uncoated micro-truss structure. The micro-truss structure used is 2"×2"×0.5" thick with a characteristic mask diameter of 800 micron, and the mask spacing from node to node is 7.8 mm with 3 struts defining the architecture. The epoxy used is TenCate 548 epoxy film adhesive. The micro-truss structure is bonded to the substrate by putting the film adhesive on the substrate and pressing the micro-truss structure into the adhesive. This is done on both the top and the bottom surfaces and heated to 80° C. for a minimum of 4 hr to set the epoxy.

Both samples are tensile tested to evaluate the strength of the bond. The solvent-bonded structure returns a tensile strength of 0.82 MPa, about three-fourths of the tensile strength found for the epoxy control sample, 1.11 MPa.

Embodiments of the present invention have a wide range of applications, such as (but not limited to) lightweight structural materials; energy-absorbing materials; heat-transfer applications; deployable structures (such as space structures); conformable core structures; acoustic damping; hook and loop attachments; compliant structures; optics for submicron waveguide formation; single body casting/net shape manufacturing; functionally graded structures; heat exchanger/insulator structures; 3D battery/fuel cell structures; thermal switch structures; catalyst support structures; filtration/separation structures; wicking materials/moisture control structures; directional optical coupler/flexible display structures; distributed lighting structures; electrical interconnects; sensor supports with high surface areas; biological growth templates; flexible body/reactive armors; stealth coatings; high friction/high wear surfaces; waveguides for other energy sources; and flame-retardant foams.

In this detailed description, reference has been made to multiple embodiments and to the accompanying drawings in which are shown by way of illustration specific exemplary embodiments of the invention. These embodiments are described in sufficient detail to enable those skilled in the art to practice the invention, and it is to be understood that modifications to the various disclosed embodiments may be made by a skilled artisan.

Where methods and steps described above indicate certain events occurring in certain order, those of ordinary skill in the art will recognize that the ordering of certain steps may be modified and that such modifications are in accordance with the variations of the invention. Additionally, certain steps may be performed concurrently in a parallel process when possible, as well as performed sequentially.

All publications, patents, and patent applications cited in this specification are herein incorporated by reference in their entirety as if each publication, patent, or patent application were specifically and individually put forth herein. U.S. Pat. No. 7,382,959, U.S. Pat. No. 8,017,193, U.S.

patent application Ser. No. 13/624,932, and U.S. patent application Ser. No. 14/197,038 are each incorporated by reference herein.

The embodiments, variations, and figures described above should provide an indication of the utility and versatility of the present invention. Other embodiments that do not provide all of the features and advantages set forth herein may also be utilized, without departing from the spirit and scope of the present invention. Such modifications and variations are considered to be within the scope of the invention defined by the claims.

What is claimed is:

1. A polymer-based microlattice structure comprising:
   (a) a first substrate layer;
   (b) a plurality of intersecting micro-truss structural elements each comprising a thermoset first polymer; and
   (c) a continuous coating layer that substantially encapsulates each of said micro-truss structural elements, wherein said coating layer comprises a second polymer,
   wherein said second polymer in said continuous coating layer bonds said first substrate layer to said thermoset first polymer, and
   wherein said microlattice structure does not contain a secondary adhesive material between said micro-truss structural elements and said first substrate layer.

2. The microlattice structure of claim 1, wherein said micro-truss structural elements are architecturally ordered.

3. The microlattice structure of claim 1, wherein said coating layer is uniformly distributed within said microlattice structure.

4. The microlattice structure of claim 1, wherein said coating layer is bonded with said first substrate layer to form a coating/substrate bond area, wherein said coating layer substantially encapsulates said micro-truss structural elements to form a coating/micro-truss contact area, and wherein said coating/substrate bond area is less than said coating/micro-truss contact area.

5. The microlattice structure of claim 4, wherein the ratio of said coating/substrate bond area to said coating/micro-truss contact area is about 0.2 or less.

6. The microlattice structure of claim 1, wherein the ratio of average thickness of said coating layer to average micro-truss structural element effective diameter is about 0.0001 to about 5.

7. The microlattice structure of claim 1, wherein said second polymer in said continuous coating layer chemically bonds said first substrate layer to said thermoset first polymer.

8. The microlattice structure of claim 1, wherein said second polymer in said continuous coating layer physically bonds said first substrate layer to said thermoset first polymer.

9. The microlattice structure of claim 1, wherein said microlattice structure does not contain mechanical joints between said micro-truss structural elements and said first substrate layer.

10. The microlattice structure of claim 1, said microlattice structure further comprising a second substrate layer that is disposed distally from said first substrate layer, wherein said second polymer in said continuous coating layer chemically and/or physically bonds said second substrate layer to said thermoset first polymer.

11. The microlattice structure of claim 1, wherein said first substrate layer comprises a thermoplastic material.

12. The microlattice structure of claim 1, wherein said first substrate layer comprises a non-thermoplastic material selected from the group consisting of a thermoset polymer, a metal, a ceramic, and combinations or composites thereof.

13. The microlattice structure of claim 1, wherein said second polymer is a thermoset polymer.

14. The microlattice structure of claim 1, wherein said second polymer is a thermoplastic polymer.

15. The microlattice structure of claim 1, wherein said second polymer is a mixture of a thermoset polymer and a thermoplastic polymer.

16. A polymer-based microlattice structure comprising:
   (a) a first substrate layer;
   (b) a plurality of intersecting micro-truss structural elements each comprising a thermoset first polymer; and
   (c) a continuous coating layer that substantially encapsulates each of said micro-truss structural elements, wherein said coating layer comprises a second polymer,
   wherein said second polymer in said continuous coating layer bonds said first substrate layer to said thermoset first polymer, and wherein said coating layer further contains magnetically active particles or domains.

* * * * *